United States Patent

Roussey

(10) Patent No.: US 8,727,934 B2
(45) Date of Patent: May 20, 2014

(54) REDUCTION GEAR AND TRANSMISSION MECHANISM INCLUDING SUCH A REDUCTION GEAR FOR CONTROLLING AN AIRCRAFT

(75) Inventor: Bastien Roussey, Tain l-Hermitage (FR)

(73) Assignee: SKF Aerospace France (FR)

( * ) Notice: Subject to any disclaimer, the term of this patent is extended or adjusted under 35 U.S.C. 154(b) by 0 days.

(21) Appl. No.: 13/578,814

(22) PCT Filed: Jan. 19, 2011

(86) PCT No.: PCT/FR2011/050091
§ 371 (c)(1),
(2), (4) Date: Jan. 8, 2013

(87) PCT Pub. No.: WO2011/089354
PCT Pub. Date: Jul. 28, 2011

(65) Prior Publication Data

US 2013/0102435 A1    Apr. 25, 2013

(30) Foreign Application Priority Data

Jan. 19, 2010    (FR) ...................................... 10 50334

(51) Int. Cl.
*F16H 57/08*    (2006.01)

(52) U.S. Cl.
USPC .......................................... 475/339; 475/331

(58) Field of Classification Search
USPC .................... 475/149, 331, 338, 339
See application file for complete search history.

(56) References Cited

U.S. PATENT DOCUMENTS

| | | | |
|---|---|---|---|
| 3,477,316 A | 11/1969 | Wildhaber | |
| 3,808,913 A * | 5/1974 | Gilbert et al. | 475/159 |
| 4,612,816 A * | 9/1986 | Chalik | 74/401 |
| 5,692,989 A * | 12/1997 | Kamlukin | 475/346 |
| 6,033,336 A * | 3/2000 | Bae | 475/341 |
| 6,117,036 A | 9/2000 | Lanzon et al. | |
| 6,123,640 A * | 9/2000 | Schulz | 475/341 |
| 6,705,970 B2 * | 3/2004 | Kakeno | 475/339 |
| 2006/0135312 A1 * | 6/2006 | Shiina et al. | 475/339 |
| 2006/0205557 A1 * | 9/2006 | Arndt et al. | 475/331 |
| 2007/0234835 A1 | 10/2007 | Owan et al. | |
| 2009/0221397 A1 | 9/2009 | Demtroder | |
| 2011/0177904 A1 * | 7/2011 | Kirschner et al. | 475/149 |

FOREIGN PATENT DOCUMENTS

WO    WO2007/135156    11/2007

OTHER PUBLICATIONS

International Search Report of PCT/FR2011/050091 completed Mar. 31, 2011.

* cited by examiner

*Primary Examiner* — Justin Holmes
(74) *Attorney, Agent, or Firm* — Knobbe Martens Olson & Bear LLP

(57) ABSTRACT

A reduction gear includes a stationary sun gear, a coaxial mobile sun gear, planet gears, and a planet carrier. In order to ensure easy, reliable assembly for the reduction gear, while transmitting high torques having a considerable speed reduction, the helical gear teeth of the stationary and mobile sun gears are reversed relative to one another and are mutually separated in the direction of the main axis of rotation, thus forming a free space between them, which is suitable for adjusting the axial position of the planet gear or gears when assembling the reduction gear, such as to engage the first and second gear teeth of the planet gear with the respective gear teeth of the stationary and mobile sun gears.

10 Claims, 6 Drawing Sheets

REDUCTION GEAR AND TRANSMISSION MECHANISM INCLUDING SUCH A REDUCTION GEAR FOR CONTROLLING AN AIRCRAFT

CROSS REFERENCE TO RELATED APPLICATIONS

This application is the U.S. National Phase of International Application No. PCT/FR2011/050091, filed Jan. 19, 2011, designating the U.S. and published as WO 2011/089354 on Jul. 28, 2011 which claims the benefit of French Patent Application No. 10 50334 filed Jan. 19, 2010.

This invention relates to a reduction gear, as well as a transmission mechanism including this reduction gear.

An aircraft, in particular a plane, generally comprises a transmission mechanism provided with at least one lever, commonly referred to as "stick", that the pilot manoeuvres in order to transmit controls to the directional members of the aircraft. The lever is connected to these directional members by a transmission of rotating movements, with reduction gear by the intermediary of a reduction gear.

A reduction gear from prior art includes two coaxial sun gears, one being stationary and the other mobile in rotation around their common axis. These two sun gears mesh their own planet gear, with these two planet gears being mounted rotatingly around a common axis, being supported by a planet carrier. This reduction gear has for input the planet carrier and for output the mobile sun gear.

In practice, the torques and/or the speeds for manoeuvring this reduction gear remain relatively low. In order to increase these torques and/or speeds, the compensation forces that are exerted on the gear drives of the reduction gear must be increased, which generates relatively substantial and fluctuating friction. For a torque and/or a speed for manoeuvring greater than a determined threshold, a dynamic play equal to the set of gears mounted without a compensation gate must be introduced. In order to obtain a play compensation function, this reduction gear therefore induces a significant production cost. In addition, the ergonomics of the lever and the piloting sensations are highly degraded because, in order to ensure good piloting ergonomics, the angular play that the lever has during manoeuvres by the pilot must in principle be as low as possible, and even zero, in both directions of driving, including for significant torque values.

With this reiterated, a particular embodiment, known to those skilled in the art, of a reduction gear is shown in FIG. 1. This reduction gear, referenced as 100, comprises two coaxial sun gears: one, referenced as 110, is stationary, while the other, referenced as 120, is mobile in rotation on itself around their common axis x-x. The respective straight gear teeth 111 and 121 of these sun gears 110 and 120 mesh with matching straight gear teeth 131 and 132 of which is provided with a long planet gear 130 supported by a planet carrier 140 in a freely rotating manner around an axis y-y parallel to the axis x-x. By providing different numbers of teeth for the gear teeth 111 and 121, the speed differential between the sun gears 110 and 120 can be used thanks to the planet gear 130 which aligns the gear teeth 111 and 121 where the planet gear meshes with these gear teeth.

In the example embodiment shown in FIG. 1, the planet gear 130 is placed at the point on the periphery of the sun gears 110 and 120 where the gear teeth 111 and 121 are in phase: in these conditions, as shown in FIG. 1, the gear teeth 131 and 132 extend rigorously in the rectilinear extension in relation to one another according to the direction of the axis y-y. In practice, it is understood that if the planet gear 130 is placed at any other point whatsoever on the periphery of the sun gears 110 and 120, the straight gear teeth 131 and 132 are to be shifted in phase angularly around the axis y-y one with regards to the other, in order to take into account the angular phase shift around the axis x-x between the gear teeth 111 and 121, linked to the fact that the respective numbers of teeth of these two gear teeth 111 and 121 differ from one another.

In these conditions, when it is sought to install several planet gears around sun gears 110 and 120, with the purpose of recovering a high density of power with minimum dimensions for the reduction gear, each planet gear must have, according to its length, two straight gear teeth, shifted in phase in relation to one another according to the location provided for this planet gear along the periphery of the two sun gears, aiming to respectively to mesh the gear teeth of the stationary sun gear and the gear teeth, more or less with a phase shift, of the mobile sun gear. As such, the various planet gears installed are all different from one another, requiring great manufacturing precision in order to prevent the blocking of the reduction gear due to the high level of hyperstaticity, and must be assembled without error at their dedicated location. In addition, these planet gears have a degree of freedom in translation along their longitudinal direction, through relative sliding between their gear teeth and the gear teeth 111 and 121 of the stationary and mobile sun gears, to an extent that the reduction gear must generally incorporate additional arrangements for controlling, and even neutralising, this axial degree of freedom. The cost of production of such a reduction gear is therefore significant.

As such, WO-A-2007/135156, on which the preamble of claim 1 is based, proposes a reduction gear of this type, of which the gear teeth can furthermore be provided helically. The assembly of this reduction gear requires complex arrangements: one of the two gear teeth of each planet gear present is delimited by a crown added to the remainder of the planet gear, being designed to be uncoupled angularly from the rest of the planet gear in order to allow for the engagement of these gear teeth with an associated mobile sun gear, while the engagement between the other gear teeth of this planet gear and an associated stationary sun gear was carried out beforehand.

The purpose of this invention is to propose a reduction gear that, while still making it possible to transmit substantial torques, with a high reduction gear, and while still being economical, robust and with a low rotating play, is rapid and reliable to assemble.

To this effect, the purpose of this invention is a reduction gear (1; 1'; 1") comprising a stationary sun gear (10) adapted to be integrally attached to a frame; a mobile sun gear (20) which, relation to the stationary sun gear, is adapted to rotate on itself around a main axis of rotation (X-X), with the stationary and mobile sun gears being provided with respective gear teeth (11, 21), which are coaxial and helical, being centred on the main axis of rotation, and of which the respective numbers of teeth are different from one another; at least one planet gear ($30_1$, $30_2$, $30_3$), which is rotating on itself around a secondary axis of rotation (Y-Y) substantially parallel to the main axis of rotation (X-X) and which is provided with first (31) and second (32) gear teeth which are helical and centred on the secondary axis of rotation and which mesh respectively the gear teeth (11) of the stationary sun gear (10) and the gear teeth (21) of the mobile sun gear (20), respectively matching the helical gear teeth of the stationary and mobile sun gears; and a planet carrier (40), which supports the planet gear or gears ($30_1$, $30_2$, $30_3$) in a freely rotating manner around their secondary axis of rotation (Y-Y) and which is adapted to rotate on itself around a main axis of rotation (X-X), characterized in that the helical gear teeth (11) of the stationary sun gear (10) and the helical gear teeth (21) of the mobile sun gear (20) are reversed in relation to one another and are separated from one another according to the direction of the main axis of rotation (X-X), by forming as such between them a free space (E) for, during assembly of the reduction gear (1), adjusting the axial positioning of one or more each planet gear ($30_1$, $30_2$, $30_3$) in such a way as to engage the first (31) and second (32) gear teeth of this planet gear with the respective gear teeth of the stationary and mobile sun gears.

The idea at the basis of the invention is to provide, for the gear teeth of the stationary and mobile sun gears, helical gear teeth which are reversed in relation to one another, while still delimiting a free space between them. As such, these two sun gears positioned coaxially immediately next to each other give the visual impression of a gear or of a double helical crown. Of course, the two gear teeth of each planet gear are provided as matching the helical gear teeth of the stationary and mobile sun gears in order to mesh with the latter: the two gear teeth of each planet gear are therefore also helical reversed. Thanks to the invention, the axial component of the efforts transmitted between the sun gears and the planet gears is substantially balanced on each planet gear. In this way, when the planet carrier is used as input while a strong speed reducing ratio is directly recovered on the mobile sun gear, used as output, the torque output is practically identical to the reaction torque on the frame, with the difference corresponding to the torque input. In addition, where applicable by providing advantageously that all of the planet gears of the reduction gear are identical to each other, the invention makes it possible to suppress the axial degree of freedom mentioned hereinabove, thanks to a self axial positioning of the planet gears: at one point of the circumference of the sun gears, and for any angular position whatsoever of the input and of the output of the reduction gear, for each planet gear, only one axial position possible corresponds which, once this planet gear is, thanks to the free space between the gear teeth of the stationary and mobile sun gears, positioned axially "straddling" between the stationary and mobile sun gears in order to be engaged with the gear teeth of the latter, no longer changes during the operation of the reduction gear.

The reduction gear according to the invention therefore makes it possible, in a compact manner, to transit a high density of power, while being each and economical to manufacture.

Additional advantageous characteristics of the reduction gear in accordance with the invention, taken separately or according to all of the technically possible combinations, are specified as follows. In some embodiments of a reduction gear disclosed herein, the respective numbers of teeth of the gear teeth (11) of the stationary sun gear (10) and of the gear teeth (21) of the mobile sun gear (20) differ from one another by a single tooth. In some embodiments, the reduction gear further comprises means for compensating the play, which can also thrust with a defined effort one or more of the planet gear ($30_1$, $30_2$, $30_3$) on the sun gears (10, 20). In some embodiments of a reduction gear, the first (31) and second (32) gear teeth of the one or more planet gear ($30_1$, $30_2$, $30_3$) are symmetrical to one another in relation to a plane ($P_1$, $P_2$, $P_3$) perpendicular to the secondary axis of rotation (Y-Y) associated to this planet gear. In some embodiments, a reduction gear includes several planet gears ($30_1$, $30_2$, $30_3$), which are individually identical to one another and of which the respective secondary axes of rotation (Y-Y) are distributed in a substantially uniform manner around the main axis of rotation (X-X). In some embodiments of a reduction gear, one or more of the planet gear ($30_1$, $30_2$, $30_3$) is made of a plastic material. In some embodiments of a reduction gear, each of the two opposite axial ends ($30_1$, $30_2$, $30_3$) of the one or more planet gear ($30_1$, $30_2$, $30_3$) is supported by the planet carrier (40), with interposition of a bearing (43), in particular a needle bearing, for guiding in rotation the secondary axis of rotation (Y-Y) associated to this planet gear. In some embodiments, the stationary (10) and mobile (20) sun gears are sun gears around which the planet gear or gears ($30_1$, $30_2$, $30_3$) are arranged. In some embodiments, the stationary and mobile sun gears are crowns inside of which the planet gear or gears are arranged.

The invention also has the purpose a movement transmission mechanism for controlling aircraft characterized in that it comprises a reduction gear (1: 1'; 1") in accordance with any of the embodiments disclosed herein.

The invention shall be better understood when reading the following description, provided solely by way of example and in reference to the drawings wherein.

Figure 1:
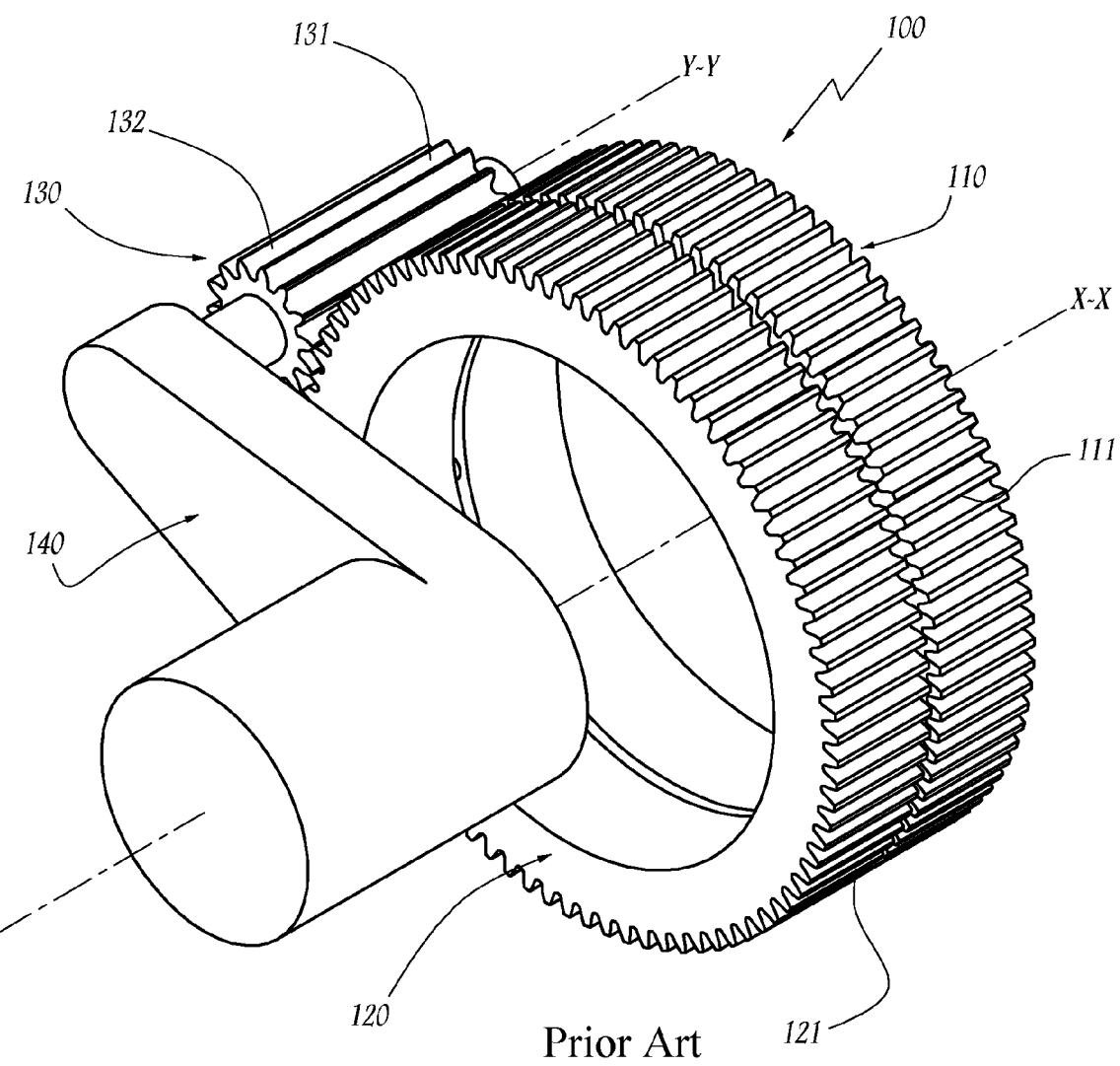
FIG. 1 is a perspective view of a reduction gear of prior art.
Figure 2:
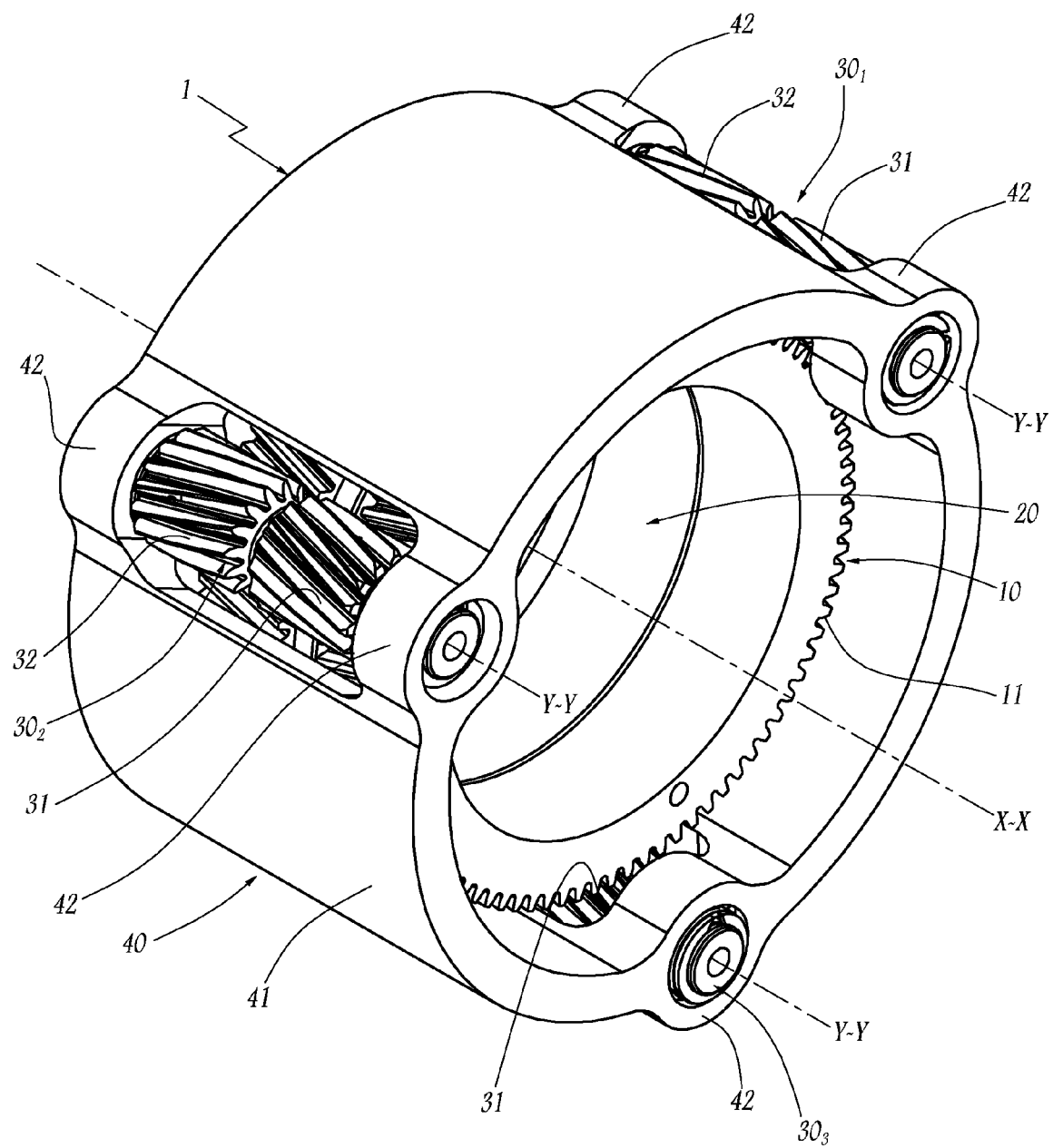
FIG. 2 is a perspective view of a reduction gear in accordance with the invention.
Figure 3:
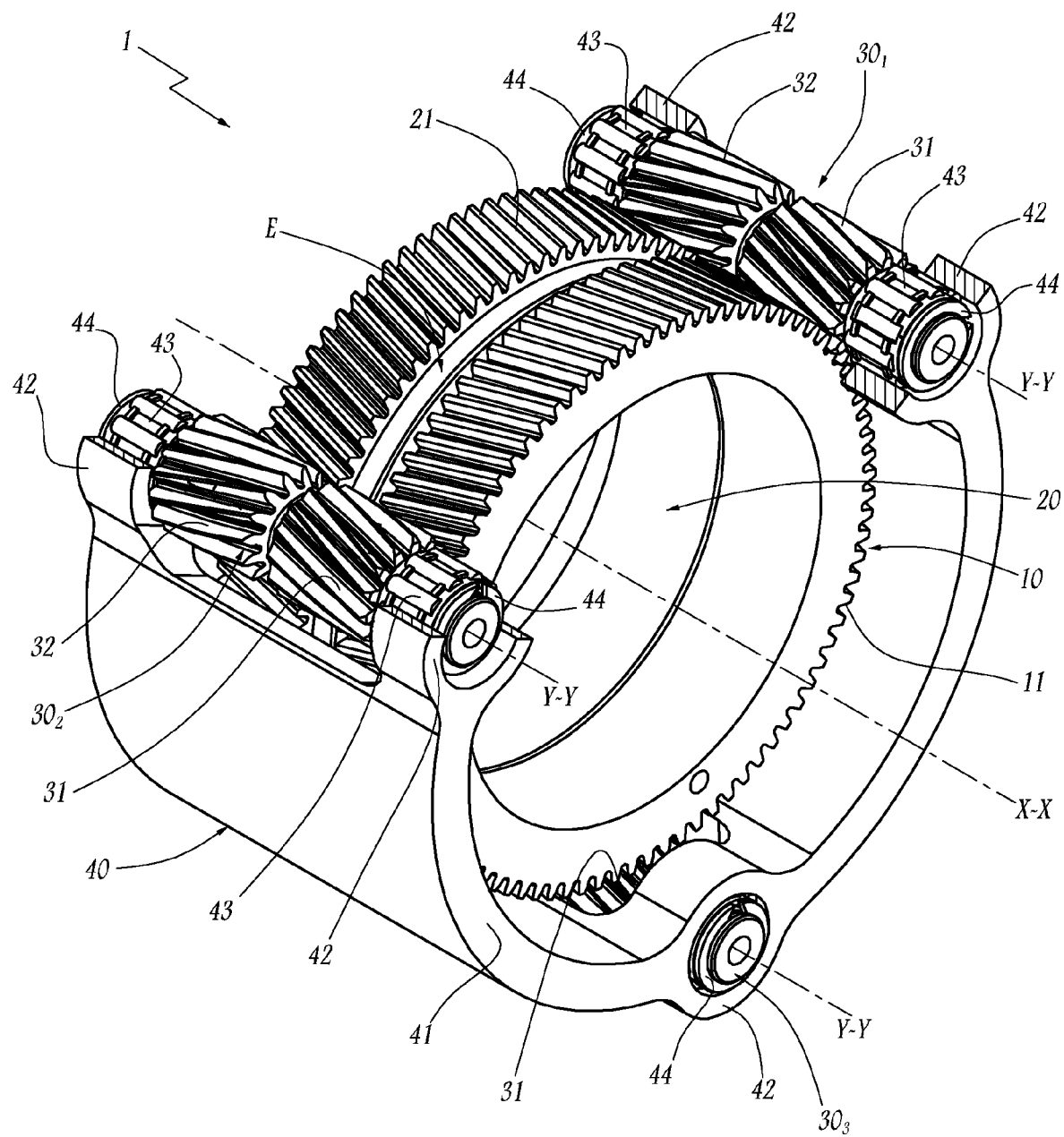
FIG. 3 is a view analogous to FIG. 1, wherein a portion of one of the components of the reduction gear has been removed, for the purposes of visibility.
Figure 4:
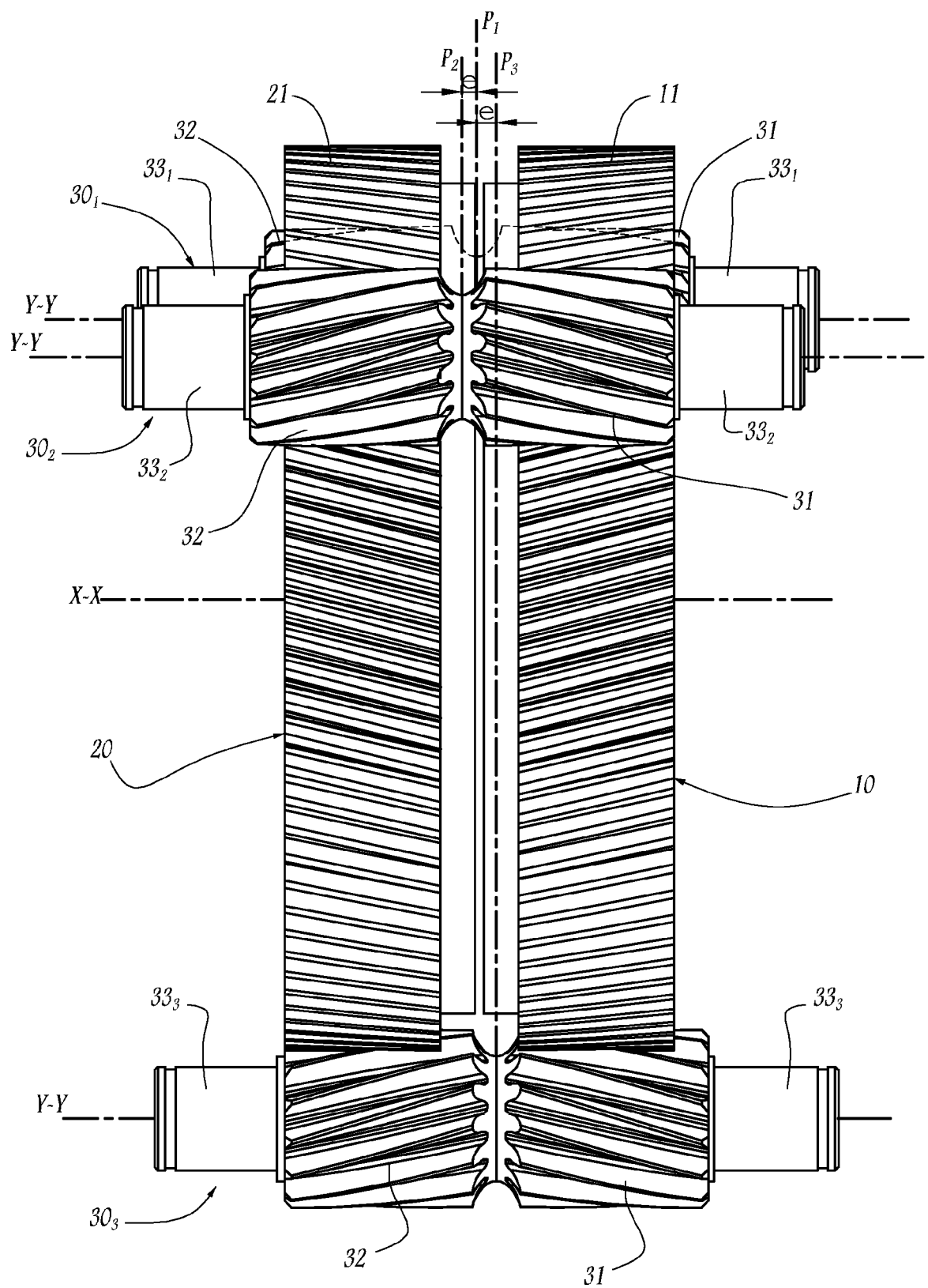
FIG. 4 is a elevational view according to a direction perpendicular to the main axis of rotation of the reduction gear, with several of the components of this reduction gear being omitted for the purposes of visibility.

In the FIGS. 2 to 4 is shown a mechanical reduction gear 1, comprising two coaxial sun gears 10 and 20, which correspond respectively to gears with exterior toothing.

The sun gear 10 is, in service, integrally attached to a frame, not shown, of the reduction gear 1, immobilising this sun gear in particular in rotation around its central axis x-x in common with the another sun gear 20.

The sun gear 20 is mounted, in relation to stationary sun gear 10, rotating on itself around the axis x-x.

In order to obtain a speed differential of rotation between the stationary 10 and mobile 20 sun gears, the respective gear teeth 11 and 21 of these sun gears have respective numbers of teeth that are different from one another. For example, the number of teeth of the gear teeth 11 is equal to the number of teeth of the gear teeth 21, plus or minus a single tooth. In practice, the number of teeth of the gear teeth 11 cannot be chosen randomly, but must satisfy the meshing conditions of the system.

In addition, as can be easily seen in FIGS. 3 and 4, the gear teeth 11 and 21 are helical, with respective helixes which are both centred on the axis x-x and reversed in relation to one another. As such, when the stationary 10 and mobile 20 sun gears are side by side are observed exteriorly as in FIG. 4, these two sun gears seem to jointly form a double helical gear.

More precisely, for reasons which shall appear further on, the gear teeth 11 and 21 are separated from one another according to the direction of the axis x-x and as such form between them a free space E, which extends over the periphery of the stationary 10 and mobile 20 sun gears.

The reduction gear 1 further comprises three planet gears $30_1$, $30_2$ and $30_3$ which are located exteriorly around stationary 10 and mobile 20 sun gears, and are distributed in a substantially uniform manner around the axis x-x. Each planet gear $30_1$, $30_2$, $30_3$ connects mechanically the stationary 10 and mobile 20 sun gears to one another. To this effect, each planet gear $30_1$, $30_2$, $30_3$ has an extended form centred on an axis y-y parallel to the axis x-x and is rigidly provided with two successive exterior gear teeth 31 and 32 according to the direction of its axis Y-Y: the gear teeth 31 substantially match gear teeth 11, in order to mesh with the latter, while the gear teeth 32 substantially match the gear teeth 21, in order to mesh with the latter. As such, as can be easily seen in FIGS. 3 and 4, the gear teeth 31 and 32 are helical with respective helixes that are both centred on the axis y-y and reversed in relation to one another.

Advantageously, the gear teeth 31 and 32 of each planet gear 30 are rigorously symmetric in relation each other in relation to a median plane of the planet gear, perpendicular to its axis Y-Y: in FIG. 4, the aforementioned planes of symmetry respectively associated to the planet gears $30_1$, $30_2$ and $30_3$ are referenced as $P_1$, $P_2$ and $P_3$. Provided different respective addendum modifications for the sun gears 10 and 20, the meshing performance between, on the one hand, the gear teeth 31 and 32 and, on the other hand, the gear teeth 11 of the stationary sun gear 10 and the gear teeth 21 of the mobile sun gear 20 are perfectly satisfactory, with a torque transmission capacity at the output that is all the more higher when the difference between the respective numbers of teeth of the gear teeth 11 and 21 is limited to a single tooth.

In service, the transmission forces between, on the one hand, the gear teeth 31 and 32 and, on the other hand, the gear teeth 11 and 21 have their axial component balanced on the gear teeth 31 and 32 for each planet gear $30_1$, $30_2$, $30_3$. The cooperation between the helical gear teeth 11 and 31, and between the helical gear teeth 21 and 32 immobilise axially as such each planet gear $30_1$, $30_2$, $30_3$, while still providing an effective torque transmission. In other words, one each planet gear is axially positioned "straggling" between the stationary sun gear 10 and the mobile sun gear 20, its axial position no longer changes during the operation of the reduction gear 1.

In addition, the three planet gears $30_1$, $30_2$ and $30_3$ are advantageously identical to one another, which facilitates the manufacture thereof and the assembly within the reduction gear 1. In this case, at one point of the circumference of the stationary 10 and mobile 20 sun gears, and for any relative angular position whatsoever between these sun gears, only a single axial positioning possible corresponds for each planet gear. In other words, as can be easily seen in FIG. 4, wherein the three planet gears $30_1$, $30_2$, $30_3$ are spaced 120° from each other around the axis X-X, they occupy respective axial positions that are different from each other: in the example shown, the planet gear $30_1$ has son plane of symmetry $P_1$ located substantially in the middle of the free space E between the gear teeth 11 and 21, while the planes of symmetry $P_2$ and $P_3$ respectively associated to the planet gears $30_2$ and $30_3$ are located on either side of the plane $P_1$. It is therefore understood that the aforementioned free space E makes it possible, during the assembly of the reduction gear 1, to adjust the axial positioning of each planet gear $30_1$, $30_2$, $30_3$ in order to both cooperate the gear teeth 11 and 31 between them and cooperate the gear teeth 21 and 32 between them. In other words, through the adjustment of the axial positioning of each planet gear $30_1$, $30_2$, $30_3$, made possible by the presence of the free space E, the gear teeth 31 of the planet gear can be engaged with the gear teeth 11 of the sun gear 10 while, simultaneously, the gear teeth 32 of this planet gear are engaged with the gear teeth 21 of the sun gear 20.

This reverts to saying that, from one axial side or from the other of the unit formed by the stationary 10 and mobile 20 sun gears, the axial ends $33_1$, $33_2$ and $33_3$ of the planet gears $30_1$, $30_2$ and $30_3$ are positioned at different levels according to the direction of the axis x-x and as such define a tilted plane which is not perpendicular to the axis X-X: in service, the orientation of this tilted plane rotates around the axis X-X, noting that the inclination of this plane primarily depends on the angle of the helix of construction of the helical gear teeth 11, 21, 31 and 32.

In practice, the fact that, here, the plane of symmetry $P_1$ associated with the planet gear $30_1$ is located substantially at an equal axial distance of the gear teeth 11 and 21, while the planes of symmetry $P_2$ and $P_3$ respectively associated with the planet gears $30_2$ and $30_3$ are located on either side of the plane $P_1$, with substantially the same relative angular distance, noted as e, in FIG. 4, makes it possible to limit as much as possible the total axial dimension of the assembly of the sun gears 10 and 20 and planet gears $30_1$, $30_2$ and $30_3$. For gear teeth having an apparent stationary module, the choice of the helix angle will modify the actual module as well as the distance e. The value of the helix angles is a compromise: the raised helix decreases the distance e, as well as the axial dimension, but also reduces the maximum transmittable torque, because axial efforts are created which solicit the materials without however contributing to the transmission of a torque. Ensure however that the aforementioned distance e is reasonable with regards to the location retained, among the various configurations possible, around the sun gears 10 and 20, the three planet gears $30_1$, $30_2$ and $30_3$ regularly distributed around the axis x-x.

Moreover, in order to limit the mass and the inertia of the planet gears $30_1$, $30_2$ and $30_3$, in order to limit the inverse inertia of the reduction gear 1, these planet gears can advantageously be made of a plastic material, in particular PEEK or synthetic nylon. This economical solution also has the advantage of limiting the friction between the planet gears and the stationary 10 and mobile 20 sun gears, thanks to the inherent flexibility of this plastic material.

The planet gears $30_1$, $30_2$ and $30_3$ are supported in a freely rotating manner around their respective axis y-y by a planet carrier 40 which can also rotate on itself around the axis X-X, as shown in the FIGS. 2 and 3. This planet carrier 40 as such guides the axes Y-Y in rotation around the axis x-x and, therefore, undergoes in service significant torsional stress. Note that at least one of the three planet gears must be positioned axially in the planet gear carrier 40, without obligation to implement rolling elements for this positioning.

Advantageously, these stresses are supported effectively by conferring on the main body 41 of the planet carrier 40 an enveloping shape, here globally cylindrical centred on the axis x-x. This main body 41 as such surrounds exteriorly the sun gears 10 and 20 and includes, for each of the planet gears $30_1$, $30_2$ and $30_3$, two rings 42 axially opposite one another, shaped in order to receive and guide in rotation the opposite axial ends $33_1$, $33_2$, $33_3$ of the planet gear. In other words, each of the two ends $33_1$, $33_2$, $33_3$ of each planet gear $30_1$, $30_2$, $30_3$ corresponds, somewhat, to a rotating trunnion which, in service, presses radially on the ring 42, with interposition of a rotating steady bearing 43, as can be seen easily in FIG. 3.

More preferably, as shown in the figures, these steady bearings 43 are comprised of needle bearings, retained around the ends $33_1$, $33_2$, $33_3$ of each planet gear by circlips 44.

For each planet gear $30_1$, $30_2$, $30_3$, the two rings 42, interiorly provided with steady bearings 43, as such effectively withstand the stresses applied to the planet gear, which tends to separate its axis of rotation y-y from its position parallel to the axis x-x.

Figure 5:
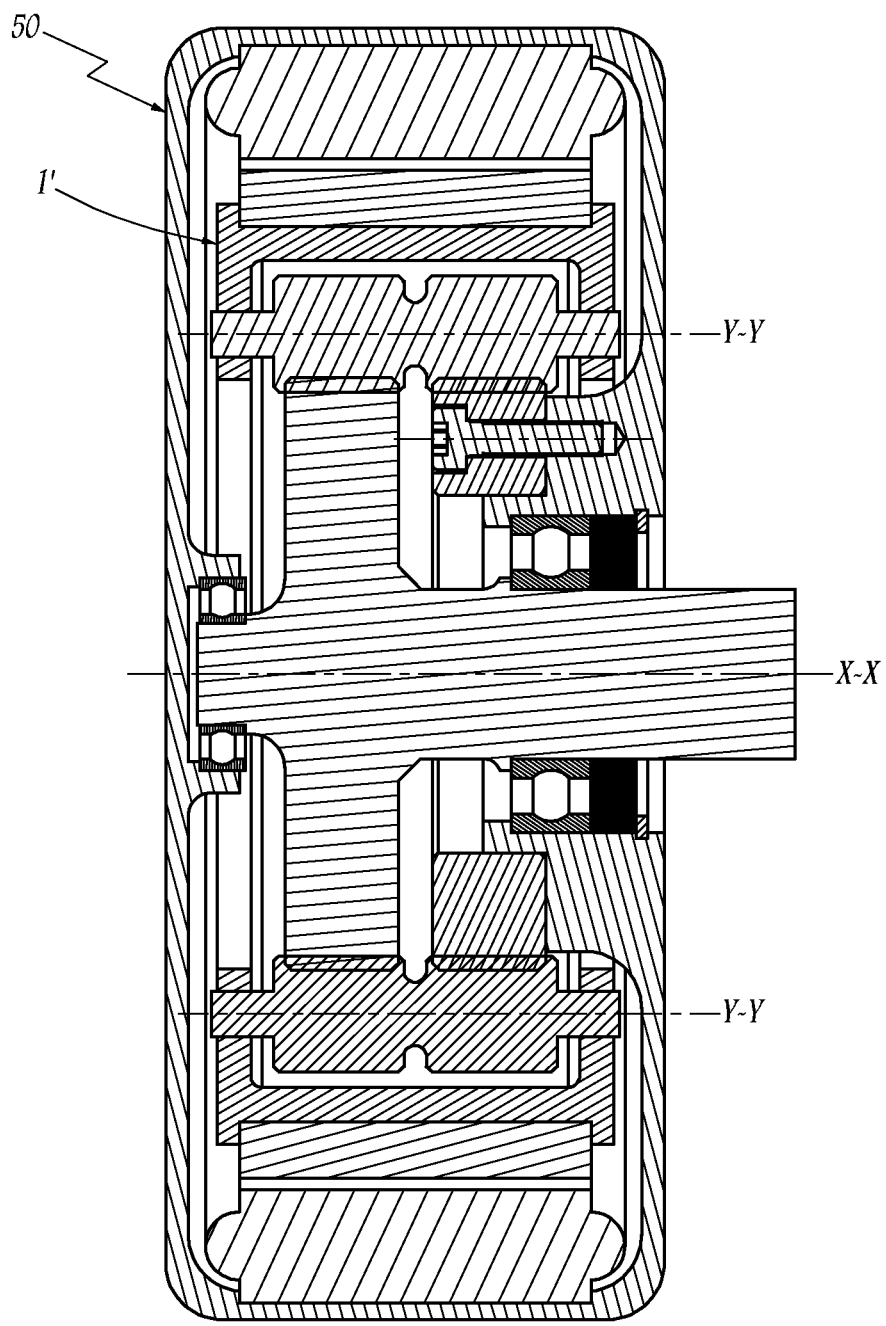
FIG. 5 is a cross-section of a movement transmission mechanism, which incorporates a reduction gear in accordance with the invention.

Within the framework of a preferred putting into service of the reduction gear 1, in particular for controlling an aircraft as mentioned in the introduction to this document, this reduction gear 1 is incorporated into a transmission mechanism between the "stick" and the directional members of the aircraft, in such a way as to use the planet carrier 40 as an input shaft while the mobile sun gear 20 is used as an output shaft: for one rotation of the planet carrier, the mobile sun gear rotates $1/Z$ revolutions or $1/(Z+1)$ revolutions according to whether the mobile sun gear has one tooth in addition or one tooth less in relation to the Z teeth of the stationary sun gear 10, thanks to the planet gears $30_1$, $30_2$ and $30_3$ mechanically connecting the gear teeth 11 and 21. A substantial speed reducing ratio is thus obtained, for example of at least sixty, with a low angular play between the input and the output, and with a torque output that is practically identical to the reaction torque on the frame, with the difference between them corresponding to the torque input. An example of such a putting into situation of the invention is shown in FIG. 5 which shows a gear-reducing mechanism 50 such as defined hereinabove, using a motor referred to as a torque motor, with a hollow rotor, and incorporating a reduction gear 1' similar to the reduction gear 1.

Moreover, the interest of the helical gear teeth 11, 21, 31 and 32 of the reduction gear 1 is then remarkable, in that they support the transmission of torques having high intensities, without supporting the cost of having to be manufactured beforehand and assembled with great precision in order to take into account the peripheral variable phase shift between the stationary and mobile sun gears. In addition, where the three planet gears $30_1$, $30_2$ and $30_3$ are individually identical, they each support efforts of the same intensity, which does not induce, over time, any dissymmetric mechanical behaviours between them.

In order to further increase the speed reducing ratio, the torque input is, alternatively, not applied directly to the planet carrier 40, but to an additional gear drive element, such as a gear or a toothed crown, which meshes with this planet carrier.

Of course, other uses of the reduction gear 1, other than that mentioned immediately hereinabove, are possible, in particular that consisting in reversing the input and the output in relation to the use hereinabove.

Figure 6:
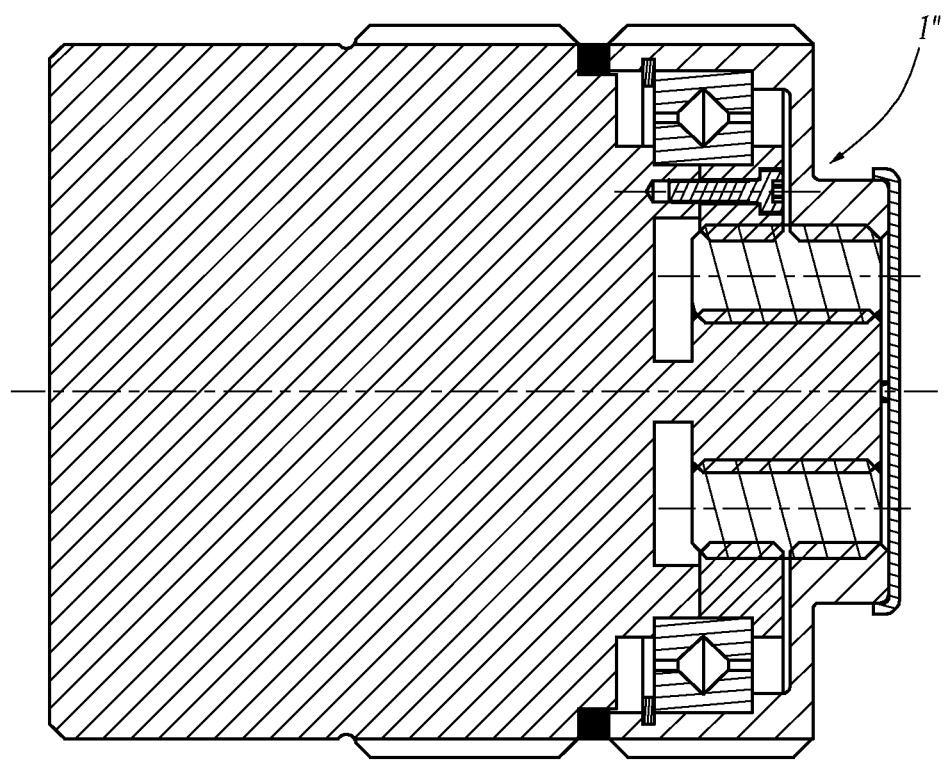
FIG. 6 is a cross-section of another embodiment of a reduction gear in accordance with the invention.

Finally, various arrangements and alternatives to the reduction gear 1 can be considered. By way of examples:

the number of planet gears of the reduction gear 1 is not limited to three; as such, a single planet gear can be provided or, on the contrary, more planet gears can be provided, thus increasing the level of hyperstaticity of the reduction gear, without however inducing significant risks of blocking;

rather than arranging the various planet gears exteriorly at the stationary 10 and mobile 20 sun gears, these planet gears can be arranged inside the toothed crowns, respectively stationary and mobile, with an operation analogous to the sun gears 10 and 20; in other words, the invention is applied to a reduction gear, such as the reduction gear 1 presented until now, wherein the planet gear or gears mesh with sun gears, which can also be referred to as interior sun gears, as well as to a reduction gear of which the planet gear or gears mesh with the aforementioned toothed crowns, which can then be qualified as exterior sun gears; this alternative embodiment is shown in FIG. 6 which shows a reduction gear 1" with toothed crowns, which is mounted in a compact gear motor, with exterior grooves, able to be used directly as a motorised knuckle joint in industry or in robotics for example; and/or optionally, additional elements, in particular elastic ones, used to thrust the planet gear or gears on the sun gears, with a defined force and/or a given travel, can be implemented in order to carry out, if needed, a radial bracing or a compensation of axial play; such elements shall be advantageously placed between the planet gear or gears and the planet carrier.

What is claimed is:

1. A reduction gear, comprising:
a stationary sun gear adapted to be integrally attached to a frame,
a mobile sun gear which, in relation to the stationary sun gear, is adapted to rotate on itself around a main axis of rotation, with the stationary and mobile sun gears being provided with respective gear teeth, which are coaxial and helical, being centred on the main axis of rotation, and of which the respective numbers of teeth are different from one another,
at least one planet gear, which is rotating on itself around a secondary axis of rotation substantially parallel to the main axis of rotation and which is provided with first and second gear teeth which are helical and centred on the secondary axis of rotation and which mesh respectively the gear teeth of the stationary sun gear and the gear teeth of the mobile sun gear, respectively matching the helical gear teeth of the stationary and mobile sun gears, and
a planet carrier, which supports the at least one planet gear in a freely rotating manner around the secondary axis of rotation and which is adapted to rotate on itself around the main axis of rotation,
wherein the helical gear teeth of the stationary sun gear and the helical gear teeth of the mobile sun gear are reversed in relation to one another and are separated from one another according to the direction of the main axis of rotation, by forming between them a free space for, during the assembly of the reduction gear, adjusting the axial positioning of the at least one planet gear in such a way as to engage the first and second gear teeth of the at least one planet gear with the respective gear teeth of the stationary and mobile sun gears.

2. The reduction gear according to claim 1, wherein the respective numbers of teeth of the gear teeth of the stationary sun gear and of the gear teeth of the mobile sun gear differ from one another by a single tooth.

3. The reduction gear according to claim 1, wherein the reduction gear further comprises means for compensating the play, which can thrust with a defined effort the at least one planet gear on the stationary and mobile sun gears.

4. The reduction gear according to claim 1, wherein the first and second gear teeth of the at least one planet gear are symmetrical to one another in relation to a plane perpendicular to the secondary axis of rotation.

5. The reduction gear according to claim 1, wherein the reduction gear comprises several planet gears, which are individually identical to one another and of which the respective secondary axes of rotation are distributed in a substantially uniform manner around the main axis of rotation.

6. The reduction gear according to claim 1, wherein the at least one planet gear is made of a plastic material.

7. The reduction gear according to claim 1, wherein each of the two opposite axial ends of the at least one planet gear is supported by the planet carrier, with interposition of a bearing for guiding in rotation around the secondary axis of rotation.

8. The reduction gear according to claim 1, wherein the stationary and mobile sun gears are gears around which the at least one planet gear is arranged.

9. The reduction gear according to claim 1, wherein the stationary and mobile sun gears are crowns inside of which the at least one planet gear is arranged.

10. A movement transmission mechanism for controlling an aircraft, said mechanism including a reduction gear comprising:
- a stationary sun gear adapted to be integrally attached to a frame,
- a mobile sun gear which, in relation to the stationary sun gear, is adapted to rotate on itself around a main axis of rotation, with the stationary and mobile sun gears being provided with respective gear teeth, which are coaxial and helical, being centred on the main axis of rotation, and of which the respective numbers of teeth are different from one another,
- at least one planet gear, which is rotating on itself around a secondary axis of rotation substantially parallel to the main axis of rotation and which is provided with first and second gear teeth which are helical and centred on the secondary axis of rotation and which mesh respectively the gear teeth of the stationary sun gear and the gear teeth of the mobile sun gear, respectively matching the helical gear teeth of the stationary and mobile sun gears, and
- a planet carrier, which supports the at least one planet gear in a freely rotating manner around the secondary axis of rotation and which is adapted to rotate on itself around the main axis of rotation, wherein the helical gear teeth of the stationary sun gear and the helical gear teeth of the mobile sun gear are reversed in relation to one another and are separated from one another according to the direction of the main axis of rotation, by forming between them a free space for, during the assembly of the reduction gear, adjusting the axial positioning of the at least one planet gear in such a way as to engage the first and second gear teeth of the at least one planet gear with the respective gear teeth of the stationary and mobile sun gears.

* * * * *